United States Patent [19]
Westberg et al.

[11] Patent Number: 5,518,052
[45] Date of Patent: May 21, 1996

[54] XY LOG CHARGER

[75] Inventors: Larry E. Westberg, Albany; James F. Uhl, Gresham, both of Oreg.

[73] Assignee: Premier Gear & Machine Works, Portland, Oreg.

[21] Appl. No.: 417,076

[22] Filed: Apr. 4, 1995

[51] Int. Cl.⁶ .................................. B27L 5/02; B27B 1/00
[52] U.S. Cl. .......................... 144/398; 82/124; 82/170; 144/357; 144/215.2; 356/384; 364/474.09
[58] Field of Search ..................... 356/376, 384, 356/386, 398; 250/559.25; 144/209 R, 209 A, 356, 357, 365; 82/124, 170

[56] References Cited

U.S. PATENT DOCUMENTS

| | | | |
|---|---|---|---|
| 3,752,201 | 8/1973 | Heth | 144/209 A |
| 3,760,855 | 9/1973 | Nilberg | 144/209 A |
| 3,806,253 | 4/1974 | Denton | 144/209 A |
| 3,902,539 | 9/1975 | Ketteler | 144/209 A |
| 4,335,763 | 6/1982 | McGee | 144/209 A |
| 4,383,560 | 5/1983 | McGee | 144/209 A |
| 4,397,343 | 8/1983 | Fields | 144/209 A |
| 4,412,297 | 10/1983 | Halgrimson et al. | 144/209 A |
| 4,737,031 | 4/1988 | Manlberg et al. | 144/209 A |
| 4,949,769 | 8/1990 | Cameron | 144/357 |

*Primary Examiner*—W. Donald Bray
*Attorney, Agent, or Firm*—Robert L. Harrington

[57] ABSTRACT

A log charging apparatus for a veneer production line. A log to be peeled is supported in a non rotative manner at a scanning station. The log is scanned and the scan data is input to a computing device to determine an optimum cylinder of the log and to determine the longitudinal axis of the optimum cylinder. Grip points relative to the axis of the optimum cylinder are determined for each end of the log. The log is transferred to the peeling lathe by a transfer mechanism that grips the log at the established grip points and aligns the longitudinal axis of the optimum cylinder with the rotational axis of the opposed spindles of the lathe. The transfer mechanism includes a movable carriage mounted on pivotable main support arms. The main support arms are pivotally movable to and from the scanning station and to and from the peeling lathe. A gripping arm having gripping pads is pivotally mounted on the carriage to facilitate gripping the log at the defined grip points and to facilitate aligning the axis of the optimum cylinder of the log with the axis of the opposed spindles of the peeling lathe.

4 Claims, 3 Drawing Sheets

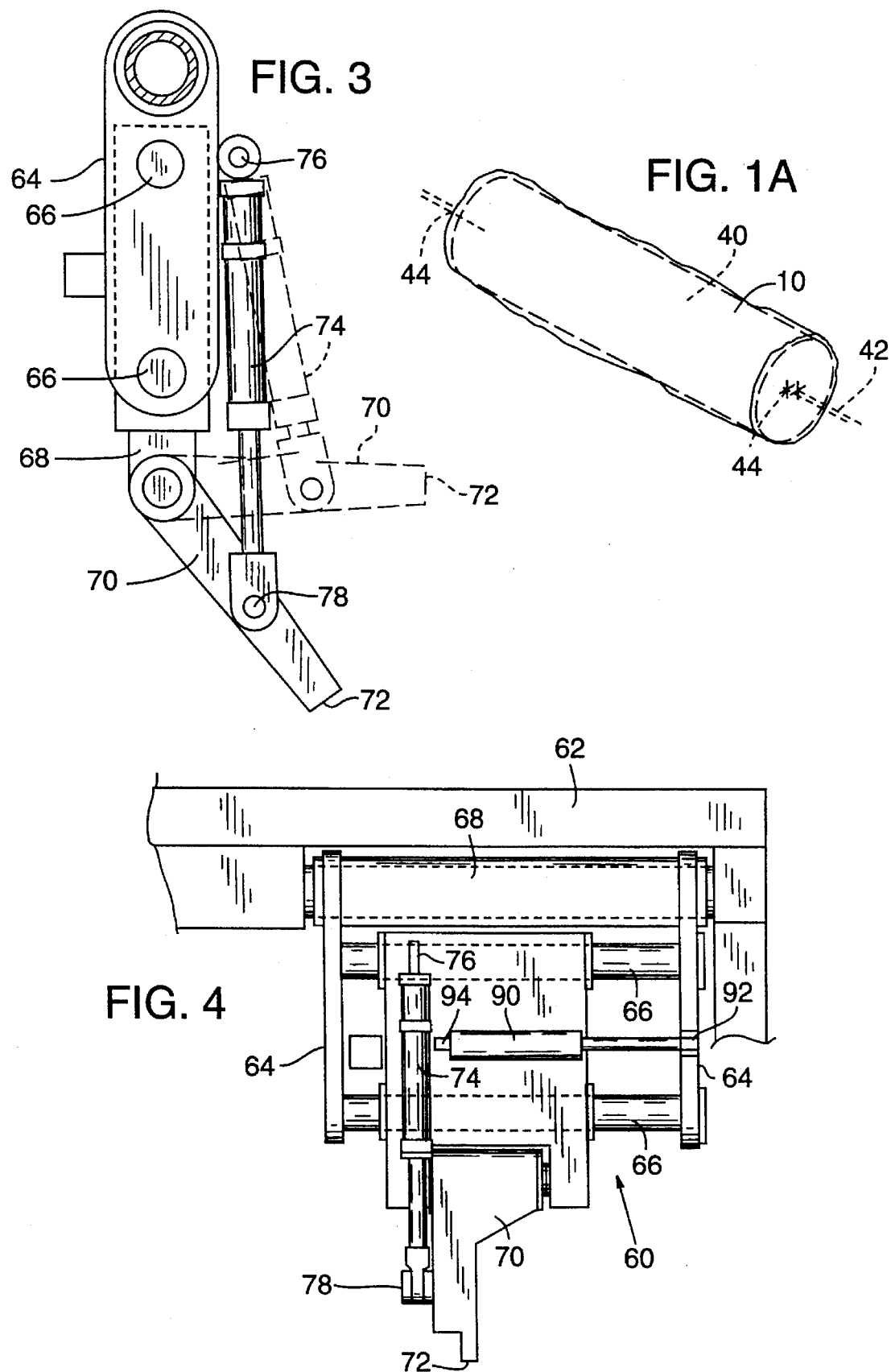

XY LOG CHARGER

FIELD OF THE INVENTION

This invention relates to log chargers for wood production lines and particularly relates to a log charger for a veneer peeling production line.

BACKGROUND INFORMATION

Veneer is produced by peeling a thin strip of material off the periphery of a log. This is an old well known practice and has been developed over the years. Currently it is standard practice to determine the maximum cylinder obtainable from the log so that during the peeling process the maximum amount of veneer will be realized.

The logs, of course, are not perfect. That is, they may be out of round, they are generally tapered from end to end and may have bends or bows along their length. In addition to these variations, logs may have other imperfections such as burls, knots, and the like.

The log is, therefore, scanned or measured by known methods to determine its optimum or maximum cylinder that is contained within the boundaries of the log. The axis of the determined cylinder is aligned with the rotational axis of the veneer lathe so that during the peeling process the maximum amount of veneer may be obtained from each log.

Prior devices supported the log to be scanned on rotatable spindles. The spindles would rotate the log and as the log was rotated, the log was scanned to obtain measurements along its length to determine the largest or optimum cylinder available in the log. The scan data also would determine the position of the axis of the optimum cylinder relative to the rotatable scanning spindles. In addition to the requirement of rotating, the scanning spindles were required to be movable along two axes normal to their rotational axis to facilitate positioning the axis of the optimum cylinder at a known position. A charging device was provided to grip the ends of the log at a position strategic to the determined axis of the optimum cylinder and transfer the log to the veneer lathe spindles to align the axis of the optimum cylinder with the rotational axis of the lathe spindle.

This type of scanning operation required complex and expensive equipment to support, rotate and position the log. The log had to be initially mounted in the scanning spindles to obtain measurements in addition to the ultimate mounting of the log in the lathe spindles. After the log was scanned, the scan data processed and the spindles repositioned to place the axis of the optimum cylinder at the desired position, a transfer device would be moved in to transfer the log from the scanning spindles to the lathe spindles. One of the problems with this arrangement was that as the log charging device or transfer device was moved in to pick up the log from the scanning spindles, there was a possibility of the charging device interfering with the scanning spindles due to the location of the axis of the optimum cylinder. Thus further rotative repositioning of the log may be required. A further potential problem is that the end of the log impaled by the scanning spindles must also be impaled by the peeling spindles and adjacent or overlapping of the spindle positions may prevent secure gripping by the peeling spindles and cause the peeling spindles to spin out of its grip on the log end.

BRIEF SUMMARY OF THE INVENTION

The log charging apparatus of the present invention utilizes a cradle support and thereby eliminates the requirement of impaling the ends of the log for rotating the log during the scanning operation. A preferred embodiment of the present invention has a step feeder to feed logs to and support the logs at a scanning station. Multiple scanners are provided at the scanning station for scanning the logs along their length. The scan data is input to a computer and from this information a gripping point is determined at each end of the log. The grip points are selected in reference to an axis of an optimum cylinder of the log. The optimum cylinder is that cylinder that will provide the greatest yield of veneer from the log. A pair of arms controlled by the computer grips the log at the determined gripping points and moves the log from the step feeder to the veneer lathe where the axis of the optimum cylinder is aligned with the rotational axis of the opposed spindles of the veneer lathe.

This arrangement eliminates the need of the complex and expensive scanning spindles since the log need not be supported and rotated by auxiliary scanning spindles and, therefore, eliminates the prior problem of the transfer arms interfering with the scanner spindles and the potential for overlapping spindle positions causing spin out of the peeling spindles.

BRIEF DESCRIPTION OF THE DRAWINGS

FIG. 1A is a view of a log illustrating an optimum cylinder superimposed in the log as determined by a scanning function of the veneer production line of FIG. 1;

FIG. 3 is view illustrating the transfer mechanism of FIG. 1; and,

FIG. 4 is another view of the transfer mechanism of FIG. 1.

DESCRIPTION OF THE PREFERRED EMBODIMENT

Figure 1:
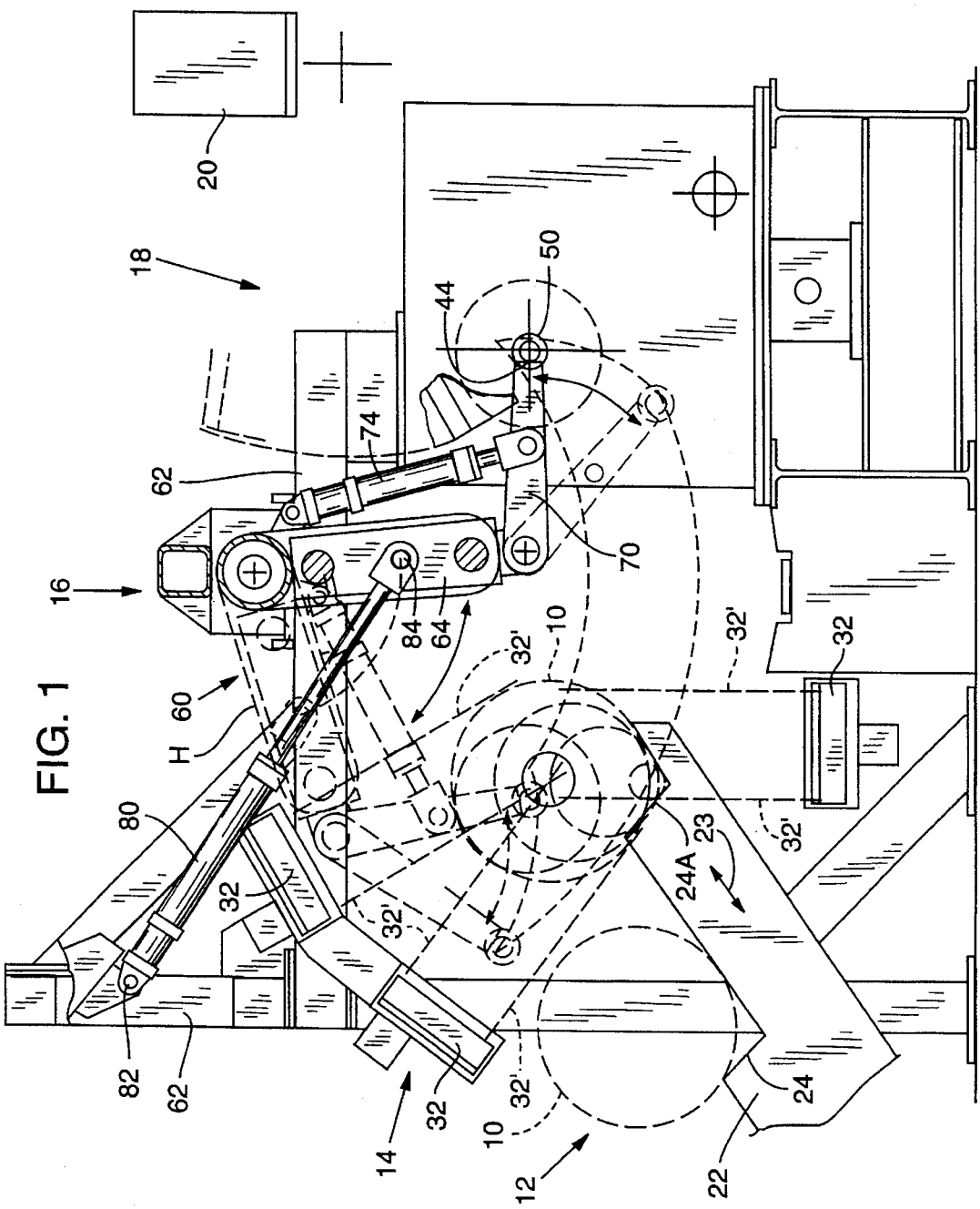
FIG. 1 is a view illustrating a portion of a veneer production line incorporating the log charger of the present invention.

FIG. 1 illustrates a portion of a veneer peeling production line that is utilized to peel a continuous strip of veneer off the periphery of a log. The veneer production line is arranged to handle logs having a wide range of diameters. Typically the production line will be arranged to handle logs having diameters in the range of about 5" to 36".

The veneer production line of FIG. 1 includes an infeed station 12, a scanning station 14, a transfer station 16, a peeling station 18 (lathe) and a computer device 20 which will hereafter be referred to as a computer 20. The computer 20 controls the operation of the illustrated production line in addition to processing the scan data of the log to determine the optimum cylinder within the boundaries of the log (see FIG. 1A), to determine the position of the longitudinal axis of the optimum cylinder with respect to the log and to determine grip points at each end of the log relative to the longitudinal axis of the optimum cylinder.

A log to be peeled is delivered to the scanning station 14 by an infeed conveyor 22 of the conveyor station 12. In this embodiment the conveyor 22 is a step feed conveyor and has steps 24 for supporting and progressively moving the log 10 to the scanning station 14. The steps 24 of the conveyor 22 are arranged to support the log 10 in a fixed position at the scanning station 14. It will be appreciated that other conveyor systems may be utilized to convey the log 10 to and support the log 10 at the scanning station 14. Different diameters of logs 10 are superimposed on a step 24A of the conveyor 22 at the scanning station 14 to illustrate the capacity range of the veneer production line.

Figure 2:
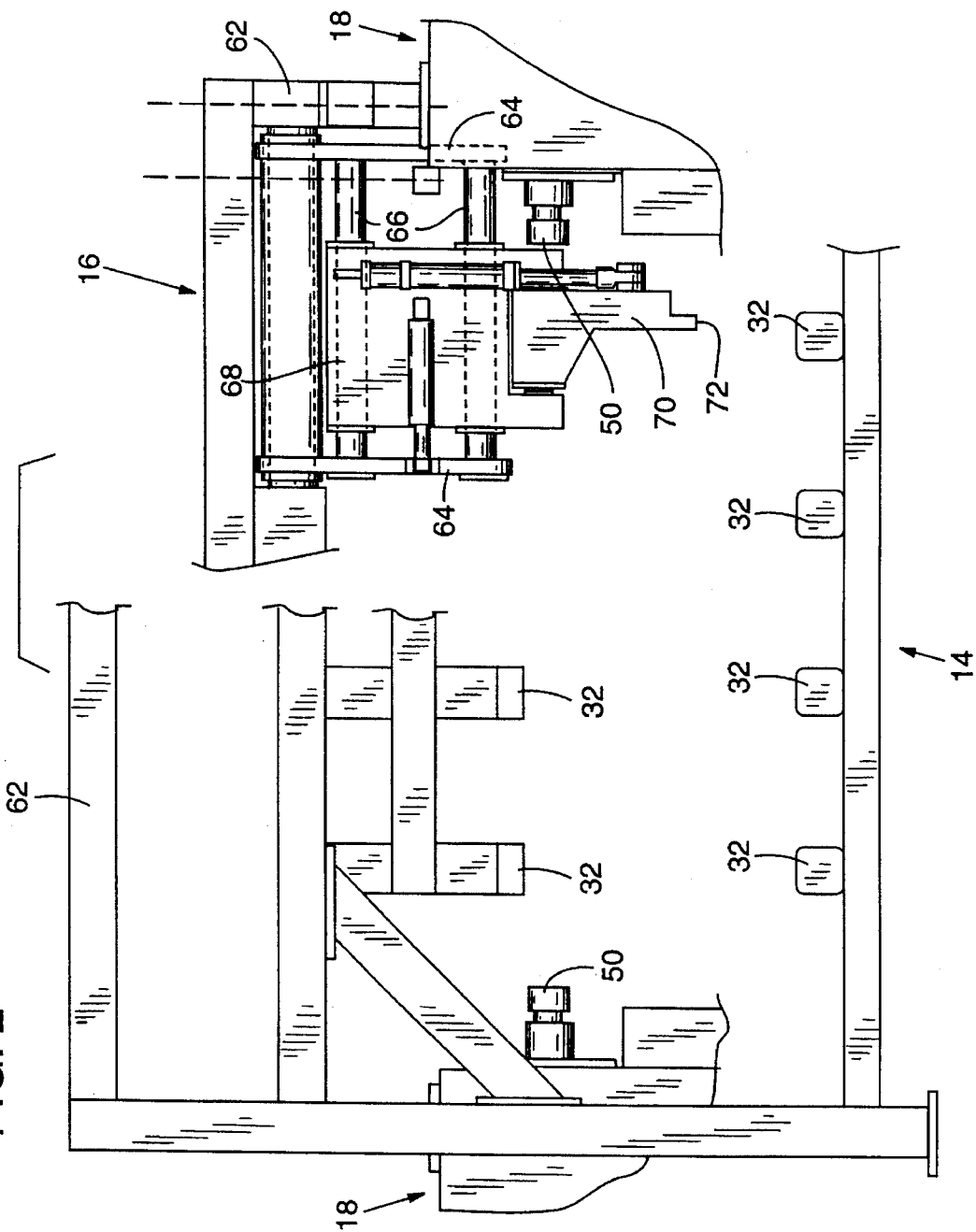
FIG. 2 is a partial side view of the veneer production line of FIG. 1 illustrating the apparatus in more detail.

A log 10 supported on a step 24A at the scanning station 14 is scanned to establish a profile of the log 10. Multiple scanner units are positioned strategic to the length of the log to be scanned and in this embodiment four scanning units (see FIG. 2) are utilized for obtaining scan data at four positions along the axial length of the log. Three scanners 32 are provided for each scan unit and are positioned strategically around the periphery of the log substantially as illustrated in FIG. 1. The scanning units in combination define a scanning system that substantially encompasses the entire log periphery at each of the four axial positions as illustrated by scan lines 32' in FIG. 1. The scan data from the scan units (scanners 32) are input to the computer 20 for analysis. The scan data processed by the computer will determine, as illustrated in FIG. 1A, an optimum cylinder 40 of the scanned log 10, the optimum rotational (longitudinal) axis 42 of the optimum cylinder 40 and will establish grip points 44 on each end of the scanned log 10. The grip points 44 at each end of the log 10 are established relative to the longitudinal axis 42 of the optimum cylinder 40 for determining the position whereat the log is to be gripped by the transfer mechanism as will be explained.

The scanned log 10, having grip points 44 established, is transferred from the scanning station 14 to the peeling station 18 (lathe) by transfer mechanisms 60 of the transfer station 16. The transfer mechanisms 60 are arranged to grip the scanned log 10 at the defined grip points 44, move the scanned log 10 to the peeling lathe 18 with the axis 42 of the optimum cylinder 40 aligned with the opposed spindles 50 of the lathe 18. The opposed spindles of the lathe 18 will impale the ends of the log 10 on the axis 42 of the optimum cylinder. The transfer mechanisms 60 are then retracted and, following "rounding", the lathe 18 will then peel the log 10 into a continuous strip of veneer.

Only one of the transfer mechanisms 60 of the transfer station 16 is illustrated in FIGS. 1, 2, 3 and 4. Referring initially to FIG. 1, the transfer mechanism 60 is mounted on a frame 62 strategic to the lathe 18, the scanning station 14 and the infeed station 12. The transfer mechanism 60 has one set of main support arms 64 pivotally mounted in a spaced relation to the frame 62 (best seen in FIG. 4). The set of support arms 64 are mounted on the frame 62 strategic to one of the spindles 50 of the lathe 18. Carriage supports (ways) 66 are mounted to the support arms 64 to extend between the support arms 64 in parallel. Slidably mounted on the ways 66 is a carriage 68. A gripping arm 70 is pivotally mounted to the carriage as shown in FIG. 4. The gripping arm 70 is pivoted relative to the carriage 68 and thus the main support arms by a cylinder 74. One end of the cylinder 74 is pivotally connected to the carriage at 76 and the other end of the cylinder is pivotally connected to the gripping arm 70 at 78.

The support arms 64 and the components mounted thereto are pivoted relative to the frame 62 (and thus relative to the scanning station 14 and the peeling station 18) by cylinder 80 as best seen in FIG. 1. One end of the cylinder 80 is pivotally mounted to the frame 62 at 82 and the opposite end of the cylinder 80 is pivotally connected to the support arm 64 at 84.

As seen in FIG. 4, the carriage 68 is slidably moveable on the ways 66 by a cylinder 90 which has one end pivotally connected to one of the support arms 64 at 92 and has the opposite end pivotally connected to the carriage 68 at 94. The gripping arm 70 is thus movable along its axis of pivot with the gripping pads 72 on each end of the arm 70 being movable substantially parallel to the axis of pivot.

The pivotal movement of the arms 64 by cylinder 80, the pivotal movement of the gripping arm 70 by cylinder 74 and the movement of the carriage 68 by cylinder 90 is controlled by the computer 20. The computer 20 will control both transfer mechanisms 60 independently and in conjunction with each other to cooperatively transfer a log 10 to the peeling lathe 18. Additionally, manual controls are provided to control the movement of the arms 64, the arm 70 and the carriage 68 of each transfer mechanism 60.

Operation:

Initially, each of the transfer mechanisms 60 are moved or positioned to a home position as indicated by the letter H in FIG. 1. A log 10 to be peeled is conveyed and positioned at the scanning station 14 strategic to the scanners 32. Referring to FIG. 1, the log 10 on step 24A is in position to be scanned. The log 10 is scanned by the scanners 32 to determine the profile of the log 10 with the scan data input to the computer 20. The computer will process the scan data to determine the optimum cylinder 40 of the log 10, the axis 42 of the cylinder 40 and will determine grip points 44 at each end of the log 10 with the grip points 44 at each end of the log 10 being strategic to the axis 42.

The carriages 68 are retracted or moved so that the arms 64 and in particular the gripping arms 70 may be pivoted without colliding with the log 10. The arms 64 and the gripping arm 70 of each transfer mechanism 60 are then pivoted as required (under the control of the computer) to position one pad 72 of the gripping arm 70 of one transfer mechanism 60 strategic to the grip point 44 at one end of the log 10 and position the other pad 72 of the other transfer mechanism 60 strategic to the grip point 44 at the other end of the log 10. Once the pads 72 are in position relative to the grip points, the carriages 68 of the transfer mechanisms 60 are moved toward each other to thus force the pads 72 against the ends of the log 10 to grip the logs between the gripping arms 70 of the transfer mechanism 60.

The conveyor 22, once the log 10 is securely gripped by the gripping arms 70, is retracted as indicated by arrow 23. The transfer mechanisms 60 are then pivoted toward the lathe 18 by pivoting the arms 64. The gripping arms 70 are pivoted in conjunction with the pivoting of the arms 64 to position the axis 42 of the optimum cylinder 40 in alignment with the axis of the opposed spindles 50 of the lathe 18.

The spindles 50 of the lathe 18, when the log 10 is positioned, will impale the ends of the log 10 at the optimum rotational axis 42 to support the log 10 for the peeling process. The carriages 68 of the transfer mechanisms 60 are then retracted away from the ends of the log 10. The peeling process is then commenced by the lathe 18 and the transfer mechanisms are moved once again toward their home positions.

While the first log 10 is being transferred from the scanning station 14 to the lathe 18, the conveyor 22 is delivering the next log 10 to the scanning station 14. The next log 10 is scanned, the scan data is processed by the computer 20 and the transfer mechanisms 60 grip the ends of the next log 10. The transfer mechanisms 60 then move the next log 10 toward the lathe 18 where it will be transferred to the spindles 50 of the lathe 18 when the peeling operation on the log 10 is completed and the core of the log 10 is removed from the spindles 50.

The operation is repeated for subsequent logs to be peeled. The arrangement of the infeed conveyor, the scanning system and the transfer mechanism in conjunction with the peeling lathe assures that a log is present and ready for loading into the peeling lathe as soon as the peeling process of the log in the lathe is completed. The logs are processed on a continuous basis without any delay between logs.

Those skilled in the art will recognize that modifications and variations may be made without departing from the true spirit and scope of the invention. The invention is therefore not to be limited to the embodiments described and illustrated but is to be determined from the appended claims.

What is claimed is:

1. A log charging apparatus for a veneer production line, comprising:

a cradle support arranged to support a log to be peeled in a non end clamping and non rotative manner and a conveyor for conveying logs in sequence along a path to said cradle support;

a scanning system including multiple fixed scanners located strategically both along the length and around the periphery of a log supported on said cradle support;

a computer device receiving scan data from the scanners and determining therefrom the log's profile and an optimum rotational axis of said log;

a peeling lathe and a transfer mechanism that sequentially transfers logs along a second path from said cradle support to said peeling lathe, said peeling lathe including a rotational axis defined by opposed spindles, said transfer mechanism including positioning mechanism for positioning the log with said optimum rotational axis of the scanned log aligned with said rotational axis of the lathe upon transfer of the log to the lathe; and said scanners each producing an elongated scan pattern encompassing a portion of the log periphery and the multiple scanners around the periphery cooperatively scanning substantially the entire periphery of the log, said scanners further located relative to said conveyor and the path of conveyance to said cradle support and relative to said transfer mechanism and path of transfer from said cradle support to avoid interference with such conveyance and transfer.

2. A log charging apparatus as defined in claim 1, wherein:

gripping points are established relative to the optimum rotational axis on each end of the scanned log by the scanning system;

said transfer mechanism arranged to grip the ends of the scanned log at the gripping points to transfer the scanned log from the support to the peeling lathe.

3. A log charging apparatus as defined in claim 2, including:

a step conveyor and whereas said cradle support is a step of the step conveyor.

4. A log charging apparatus as defined in claim 2, wherein:

the transfer mechanism includes a pair of pivotally mounted carriages, said carriages pivotally movable to and from said cradle support and to and from the peeling lathe, a gripping arm pivotally mounted to each carriage and a gripping pad on each gripping arm, said carriages and said gripping arms independently movable and providing the positioning mechanism.

* * * * *